(12) United States Patent
Roche et al.

(10) Patent No.: US 10,768,776 B1
(45) Date of Patent: Sep. 8, 2020

(54) STREAMING VIRTUAL OBJECTS FOR INCORPORATION IN VIRTUAL ENVIRONMENTS

(71) Applicant: Amazon Technologies, Inc., Seattle, WA (US)

(72) Inventors: Kyle Michael Roche, Mercer Island, WA (US); David Chiapperino, Seattle, WA (US); Vasily Vasinov, Superior, CO (US)

(73) Assignee: Amazon Technologies, Inc., Seattle, WA (US)

( * ) Notice: Subject to any disclaimer, the term of this patent is extended or adjusted under 35 U.S.C. 154(b) by 226 days.

(21) Appl. No.: 15/685,914

(22) Filed: Aug. 24, 2017

(51) Int. Cl.
| G09G 5/00 | (2006.01) |
| G06F 3/0481 | (2013.01) |
| H04N 7/15 | (2006.01) |
| H04L 29/06 | (2006.01) |
| G06T 19/00 | (2011.01) |

(52) U.S. Cl.
CPC .......... *G06F 3/04815* (2013.01); *H04L 67/38* (2013.01); *H04N 7/157* (2013.01); *G06T 19/00* (2013.01)

(58) Field of Classification Search
CPC ....... G06T 19/006; G06T 19/00; G06F 3/011; G06F 3/012; G02B 27/017
USPC ........................................................ 345/633
See application file for complete search history.

(56) References Cited

U.S. PATENT DOCUMENTS

| 2006/0058103 | A1* | 3/2006 | Danieli | A63F 13/12 463/42 |
| 2007/0199018 | A1* | 8/2007 | Angiolillo | H04N 5/44543 725/39 |
| 2010/0227682 | A1* | 9/2010 | Reville | A63F 13/12 463/29 |
| 2013/0257877 | A1* | 10/2013 | Davis | A63F 13/12 345/473 |

* cited by examiner

*Primary Examiner* — Gordon G Liu
(74) *Attorney, Agent, or Firm* — Thorpe North & Western, LLP.

(57) ABSTRACT

A technology is described for streaming object data for a virtual object to a simulation client and dynamically incorporating the virtual object into a simulation environment in response to detecting an interactive event in the simulation environment. An example method may include receiving an indication of an interactive event associated with a simulation environment, where the indication of the interactive event may be sent over a network by a simulation client configured to execute the simulation environment. In response to receiving the indication of the interactive event, object data for a virtual object linked to the interactive event may be identified. An audio stream for the virtual object may be obtained, and the object data and the audio stream may be streamed to the simulation client and the virtual object may be incorporated in the simulation environment.

20 Claims, 10 Drawing Sheets

STREAMING VIRTUAL OBJECTS FOR INCORPORATION IN VIRTUAL ENVIRONMENTS

BACKGROUND

Computing devices are becoming more commonplace and are used for a wide variety of purposes. Every day, people use their computing devices to view, access, and/or interact with various types of content and information, especially as computing devices and applications are growing in number and in function. As an example, an increasing number of applications are attempting to meet our growing expectations of computing devices by providing virtual reality, augmented reality, mixed reality, or three-dimensional experiences.

Virtual and augmented reality allows interaction with users (e.g. using avatars), virtual objects, and information within a virtual reality and augmented reality environment. When using a virtual and augmented reality environment, interactions with the environment may include electronic input (e.g., via a game controller or input device), verbal input (e.g., via a microphone), and physical input (e.g., via motion sensing devices) relating to the manipulation of physical objects, and so forth. Virtual objects (e.g., virtual actors, virtual characters, audio visual devices, etc.) may be configured to interact with users (e.g. users represented by an avatar). For example, the appearance, dialog, location, and other attributes of a virtual object can be changed based in part on virtual user interactions.

DETAILED DESCRIPTION

Figure 1A:
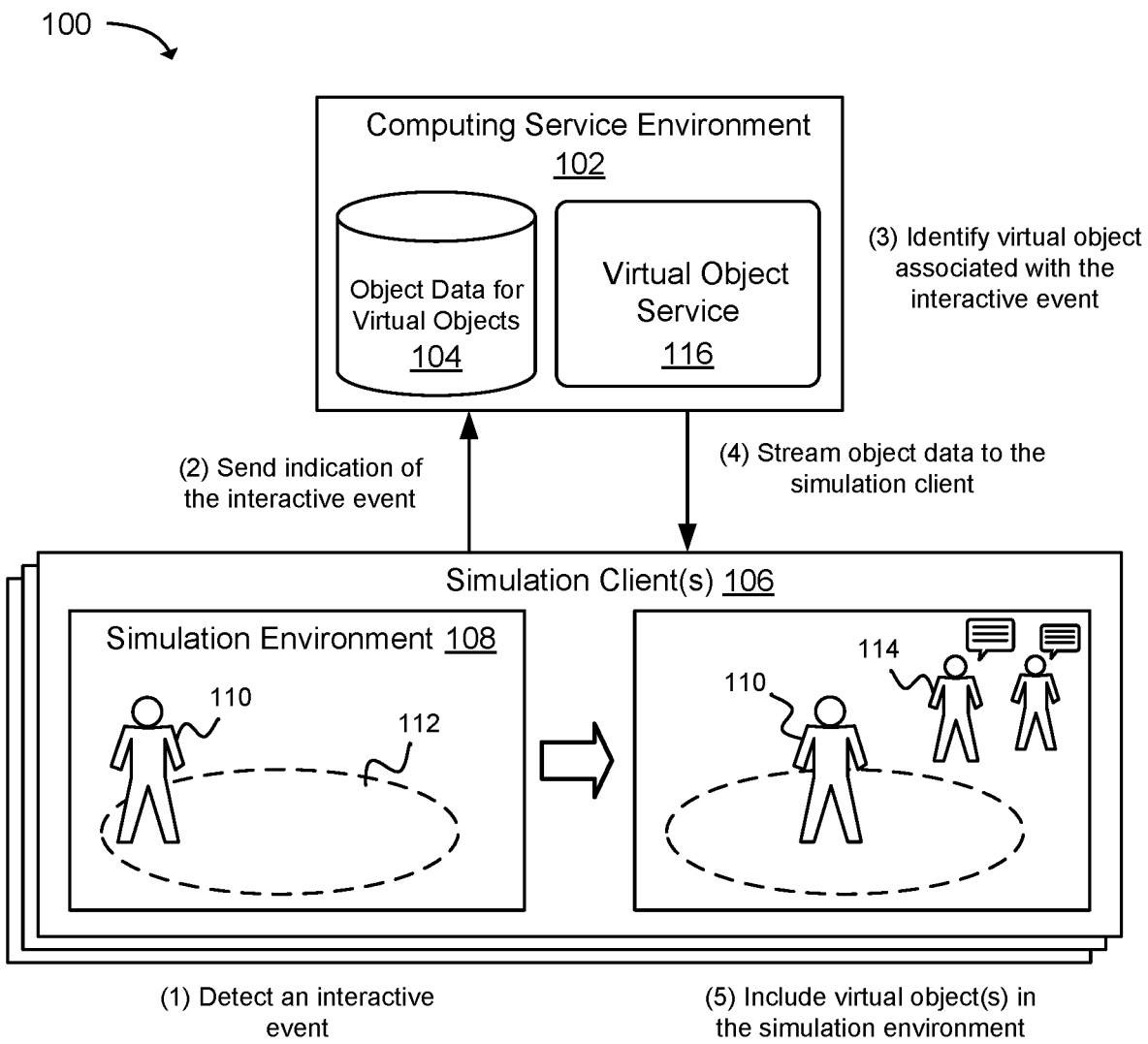
FIG. 1a is a block diagram illustrating an example system and method for providing object data for virtual objects to a simulation client as part of receiving an indication of an interactive event in a simulation environment.

A technology is described for streaming object data for a virtual object in a simulation environment to a simulation client (e.g., a VR (Virtual Reality) client) configured to dynamically incorporate the virtual object into the simulation environment in response to detecting an interactive event in the simulation environment. The virtual object may be used to communicate a message to physical users of simulation clients who may be represented by virtual users in the simulation environment. As one example, object data for a virtual object may be streamed from a service provider environment to a simulation client and the virtual object may be incorporated into a simulation environment as a background element (e.g., a member of a crowd). The object data may include three dimensional graphics, speech data (speech text or speech audio), and/or animation instructions for a virtual object. The virtual object may be used to indirectly communicate a message to a virtual user which can be received by a physical user. As one example, a message may be communicated as a conversation between two virtual objects (e.g., two members of a crowd) and the message may be "overheard" by a virtual user who is within a defined distance of the virtual objects. A simulation environment may be a three dimensional (3D) generated environment where portions of the environment or the entire environment are rendered using computer graphics. Examples of a simulation environment may include virtual reality (VR) environments, augmented reality (AR) environments, mixed reality environments, gaming environments, and other computer generated environments. A simulation client may be used to render and view the simulation environment and simulation clients may include VR headsets, AR headset, mixed reality clients, personal computer (PC) clients, mobile device clients, and other similar systems which enable viewing of the simulation environment.

In one example of the technology, customers of a computing service provider may create virtual objects configured to provide messages to users in a simulation environment. The virtual objects may include, but are not limited to: avatars (e.g., a human avatar, animal avatar, fantasy avatar, etc.) and other simulated objects (e.g., a loud speaker, billboard, magazine, etc.) that may be included in a simulation environment to communicate a message. The customers may assign metadata to the virtual objects that link the virtual objects, and/or messages provided by the virtual objects, to interactive events. Object data and metadata for the customers' virtual objects may be stored in a computing service environment (e.g., a "cloud" environment) using managed storage services provided by the computing service provider.

A simulation client configured to execute a simulation environment may detect an interactive event. The interactive event may include an action performed by a virtual user, such as entering a virtual space (e.g., a virtual public park, shopping mall, bus station, etc.), passing a waypoint, or interacting with an object in the simulation environment (e.g., turning on a virtual radio or television). The interactive event may also include events that include detecting that a virtual user has been in a location for a predetermined amount of time, passed a waypoint, purchased a product, or other like event. In response to detecting the interactive event, object data for a virtual object may be obtained from the computing service provider and the computing service provider may stream the object data from an object storage service to the simulation client. The simulation client may use the object data to include the virtual object in the simulation environment and the virtual object may be animated to communicate a message to the virtual user and associated physical user.

In the past, simulation experiences have been limited to fixed simulation environments, where virtual objects could not be dynamically added to the fixed simulation environment. For example, virtual objects that provided dialog were preconfigured features of the fixed simulation environment. As a result of the present technology, virtual objects may be dynamically added to a simulation environment. Further, object data for a virtual object may be streamed to a simulation client in response to detecting an interactive event in a simulation environment generated using the simulation client. The simulation client may use the object data to dynamically add the virtual object to the simulation environment or animate the virtual object and provide audio or visual output to communicate a message.

To further describe the present technology, examples are now provided with reference to the figures. FIG. 1a is a diagram illustrating a high level example of a system 100 and method used to provide object data 104 for virtual objects 114 to a simulation client 106 as part of receiving an indication of an interactive event. The system 100 may include a computing service environment 102 that includes computing resources for storing object data 104 for virtual objects 114, for retrieving the object data 104, and streaming the object data 104 to a simulation client 106 for inclusion in a simulation environment 108 provided by a simulation client 106.

Customers of a computing service provider may store object data 104 for virtual objects 114 in the computing service environment 102 using storage services (e.g., managed storage services) provided by the computing service provider. Examples of the storage services may be data stores that store data objects, data files, key value pairs and other highly scalable storage services in the computing service environment 102. A virtual object 114 may include a graphical entity such as an avatar, human representation, simulated character, simulated animal, large screen monitor, audio output device or the like, which may be configured to simulate a human conversation or human presentation that includes verbal and visual expressions detected in speech data. The customer may configure one or more virtual objects 114 for inclusion in a simulation environment 108 as background objects (e.g., members of a crowd, passersby, signage, public announcement system speaker, etc.). The customers may configure their virtual objects 114 to indirectly communicate a message to a virtual user 110. More specifically, a physical user of a simulation client 106 may be represented in a simulation environment 108 using a virtual user 110 (e.g., a physical user's avatar) and a virtual object 114 may be animated to simulate communication of a message that may be communicated to the physical user of the simulation client 106. For example, the message may be provided as background noise, such as, but not limited to: a one-sided conversation, a conversation between a plurality of virtual objects 114 (e.g., virtual characters), or a message played over a large virtual video screen and the message may be virtually overheard in the simulation environment.

The customers of the computing service provider may assign metadata to object data 104 for virtual objects 114 and the metadata may be used to identify the virtual objects 114 for inclusion in a simulation environment 108. In one example, metadata may be automatically generated for virtual objects 114 created by customers as part of uploading object data 104 for the virtual objects 114 to an object data store in the computing service environment 102. For example, the object data 104 for the virtual objects 104 may be analyzed for attributes and metadata for the attributes may be generated and assigned to the object data 104. Illustratively, attributes of a virtual object 114 may include virtual object attributes (e.g., man, woman, child, animal, inanimate object, etc.), communication attributes (e.g., one-sided conversation, full conversation, or narration), personality attributes (e.g., loud, quiet, expressive, etc.), situational attributes (e.g., casual, formal, professional, etc.). Object data 104 for a virtual object 114 may be analyzed for these attributes and metadata describing the attributes may be generated and assigned to the object data 104. The metadata may be stored with the object data 104 for the virtual object 114. Metadata describing the attributes of a virtual object 114 may correlate to context information for an interactive event, as described below, and the metadata may be used to identify the virtual object 114 for inclusion in a simulation environment 108 when linked to the interactive event.

In one example, metadata for object data 104 may be stored with the object data 104 in an object data store. The metadata may identify the object data 104 in the object data store. Metadata for object data 104 may link a virtual object 114 to an interactive event. More specifically, the metadata may be used to associate or link virtual objects 114 with interactive events triggered by virtual users 110. Metadata assigned to object data 104 for the virtual objects 114 may be used to identify the object data 104 in response to an interactive event. Illustratively, an interactive event may include entering a virtual space 112 by a virtual user 110, or some other virtual action performed by a virtual user 110 (e.g., picking up an object, interacting with an object, etc.).

In another example, metadata for object data 104 may also be used to associate virtual objects 114 with attributes of virtual users 110. More specifically, the attributes of a virtual user 110 may be linked to the attributes of a physical user represented by the virtual user 110, and the attributes of the physical user may be used to identify a virtual object 114. Illustratively, attributes of a physical user that may be used to identify a virtual object 114 include, but are not limited to: personally identifying information, demographic information, a product purchase history, and/or a user's browsing history (e.g., an Internet browsing history).

In yet another example, metadata for object data 104 may include information that associates a virtual object 114 with the context of a simulation environment 108 (e.g., a time, place, and/or circumstances represented by the simulation environment 108). For example, the metadata may describe attributes of a virtual object 114. Illustratively, attributes of a virtual object 114 may include, but are not limited to: a virtual object type (e.g., man, woman, child, animal, inanimate object, etc.), a communication type (e.g., one-sided conversation, full conversation, or narration), a personality type (e.g., loud, quiet, expressive, etc.), situational type (e.g., casual, formal, professional, etc.).

As an illustration, metadata for object data 104 may describe a virtual object 114 as a person on a park bench talking on a cell phone (i.e., a one-sided conversation). The metadata may link the virtual object 114 (i.e., object data 104 for the virtual object 114) to an interactive event such as a virtual user 110 entering a virtual public park. More specifically, attributes of the interactive event (i.e., a description of a virtual space 112) link the interactive event to the metadata for the object data 104.

Figure 1B:
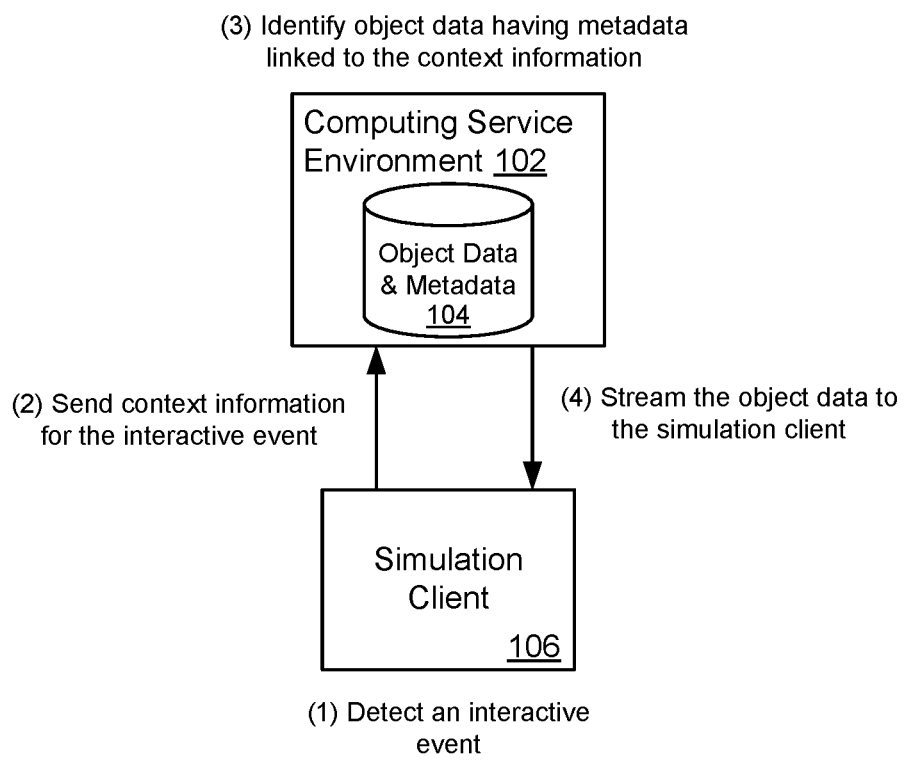
FIG. 1b is a block diagram illustrating an example of using context information to identify object data using metadata linked to the context information.

The virtual objects 114 provided by the customers of the computing service provider 102 may be dynamically incorporated into simulation environments 108 rendered using simulation clients 106. A simulation client 106 may comprise a VR headset, gaming device, mobile device, desktop computer, smart television, or another compatible computing device. In one example, a simulation client 106 may be configured to detect an interactive event in a simulation environment 108 that is linked to a virtual object 114 and send an indication of the interactive event, via an API (Application Programming Interface) request to a virtual object service 116 in the computing service environment 102. The API request may include context information for the interactive event that may be used by a virtual object service 116 to identify object data 104 for a virtual object 114. More specifically, the context information may be used to identify object data 104 having metadata that is linked to the context information, as illustrated in FIG. 1b. Illustratively, as described in greater detail below, context information may include: information for an interactive event, information for a virtual user 110 associated with the interactive event, and/or information for a simulation environment 108 in which the interactive event occurred. The context information may be used to identify metadata stored with object data 104 that corresponds to the context information. As an illustration, an interactive event may be detected when a virtual user 110 enters a virtual space 112 in a simulation environment 108 rendered on a simulation client 106. Illustratively, the virtual space 112 may include a virtual location or bounded area within the simulation environment 108 and the interactive event defined for the virtual space 112 may be triggered when a virtual user 110 enters the virtual space 112. The simulation client 106 may detect the interactive event (which identifies the interactive event and provides context information for the interactive event), and the simulation client 106 may send an API request to the virtual object service 116. As a non-limiting example, an interactive event may be defined for a virtual space 112 comprising a virtual shopping mall. When a virtual user 110 enters the virtual shopping mall, a simulation client 106 may obtain context information for the interactive event, such as an identity of the virtual user 110 and attributes associated with the virtual shopping mall, and the simulation client 106 may send an API request to the virtual object service 116 that includes the context information.

In response to receiving the API request, the virtual object service 116 may be configured to obtain object data 104 for a virtual object 114 using context information provided in the API request. As described above, the context information may include interactive event information, virtual user information, and/or simulation environment information. The context information may be used to identify metadata stored with a virtual object 114 that corresponds with the context information.

As one example of using context information to identify a virtual object 114, interactive event information (e.g., entering a virtual space 112) may be used to identify metadata for a virtual object 114 that links the virtual object 114 with the interactive event. As a specific example, in response to receiving an API request indicating that a virtual user 110 has entered a virtual retail store, object data 104 for a virtual object 114 having metadata that associates the virtual object 114 with the virtual retail store may be identified.

As another example, user attributes for a physical user represented by a virtual user 110 may be used to identify metadata stored with a virtual object 114 that associates the virtual object 114 with the user attributes. Illustratively, the user attributes may include: personally identifying information, demographic information, product purchase history, and/or browsing history. As a further example, demographic information for a physical user may be used to identify object data 104 for a virtual object 114 having metadata that associates the virtual object 114 with a particular demographic that includes the physical user.

As another example of using context information to identify a virtual object 114, simulation environment information, such as environment type (e.g., real-world, fantasy world, etc.), virtual geographic location, gameplay information, virtual time and weather information, and the like may be used to identify metadata for a virtual object 114 that associates the virtual object 114 with the simulation environment information. As a specific example, time-period information (e.g., a medieval time-period) may be used to identify object data 104 for a virtual object 114 having metadata that associates the virtual object 114 with the time-period (e.g., a virtual object 114 wearing medieval clothing).

In one example, conversation text for a virtual object 114 may be constructed using conversation nodes included in object data 104 for the virtual object 114. The conversation text may be constructed using conversation nodes that are associated with context information provided by a simulation client 106 in response to detecting an interactive event 112. A customer of the computing service provider may create a conversation tree for a virtual object 114 and the customer may provide conversation nodes that are linked to context information (e.g., information for an interactive event, information for a virtual user 110 associated with the interactive event, and/or information for a simulation environment 108 in which the interactive event occurred) The conversation nodes may be used to populate the conversation tree. In response to detecting an interactive event 112, a simulation client 106 may provide context information to the virtual object service 116 and the context information may be used to construct conversation text using conversation nodes included in object data 104, and the conversation text may be converted to an audio stream and provided to the simulation client 106 to animate a virtual object 114 in a simulation environment 108. As an illustration, a conversation tree may be directed to advertising a product via a conversation between two virtual objects 114. Context information for an interactive event may include user attributes (e.g., gender, age, etc.) which may be used to select conversation nodes associated with the user attributes (e.g., select conversation nodes for a product directed to a specific gender, age, etc.).

In one example, context information provided by a simulation client 106 may include an image or video of a physical user represented by a virtual user 110. The image or video may be analyzed using an image recognition technique configured to identify user attributes for users and object attributes detected in the image or video. The user attributes and object attributes may be used to select conversation nodes included in object data 104 and construct conversation text for a virtual object 114. Object data 104 obtained by the virtual object service 116 may include three dimensional graphics, speech data (e.g., speech text or speech audio), and/or animation instructions, which may be used by a simulation client 106 to animate a virtual object 114 in a simulation environment 108. Speech data included in object data 104 may be used to provide a message as described earlier. In one example, object data 104 may include speech text that may be converted to an audio stream. A highly scalable object data store in the computing service environment 102 may be used to provide the audio stream, graphics, and animation instructions to a simulation client 106. More specifically, a data stream that includes the audio stream, graphics, and animation instructions may be streamed from the computing service environment 102 to the simulation client 106. Alternatively, a file data store or key value data store may be used to obtain the object data 104. The simulation client 106 may use the audio stream, graphics, and animation instructions included in the data stream to add the virtual object 114 to the simulation environment 108 and render (e.g., animate) the virtual object 114 to simulate communication of the message included in the audio stream, graphics, or animation instructions.

Figure 2:
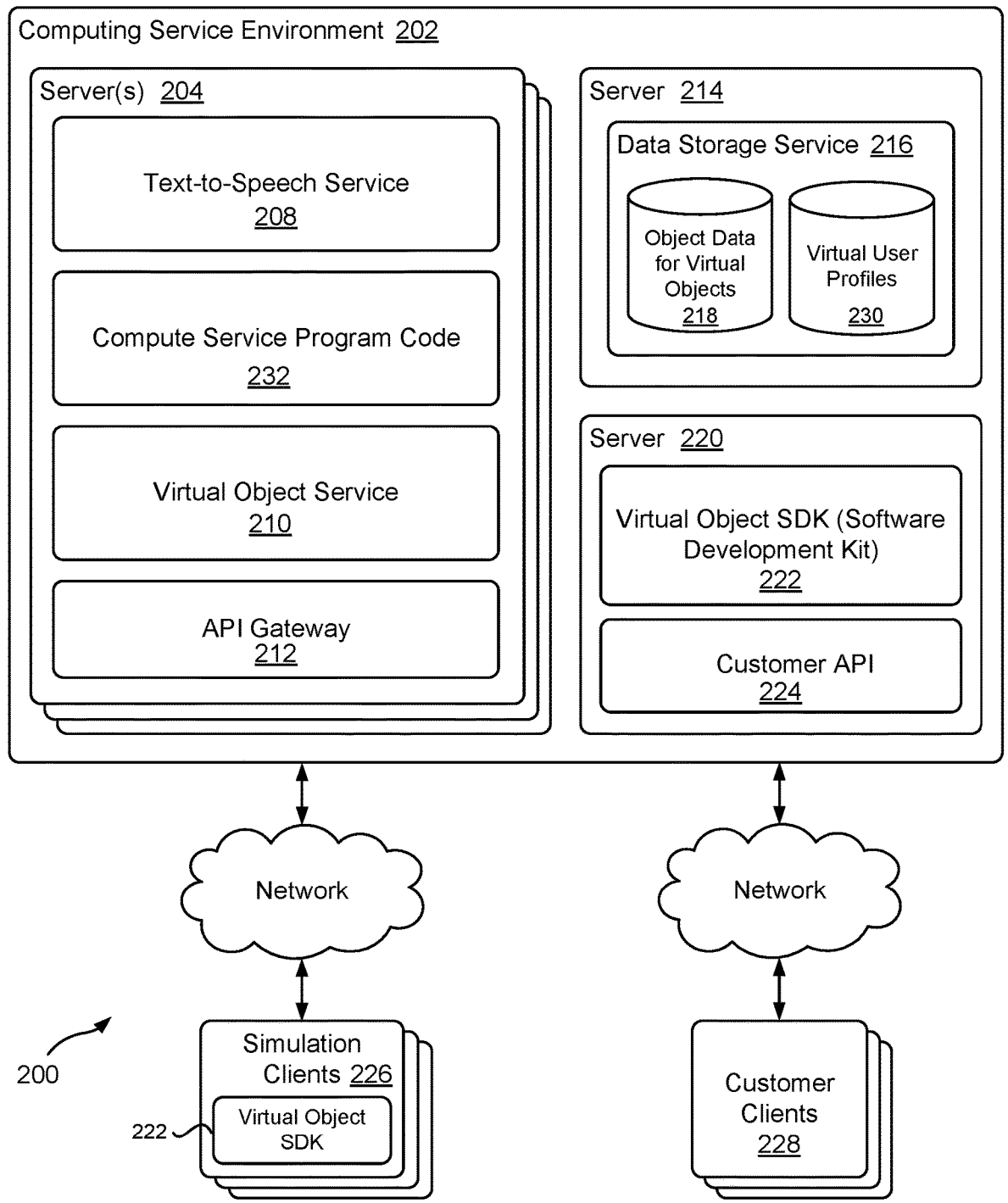
FIG. 2 is a block diagram that illustrates various example components included in a system for providing object data for virtual objects to a simulation client as part of receiving an indication of an interactive event in a simulation environment.

FIG. 2 illustrates components of an example system 200 on which the present technology may be executed. The system 200 may include virtualized servers 204, 214, 220 or computing instances located in a computing service environment 202. The computing service environment 202 may include computing resources for executing computing instances (e.g., virtual machines), which may be an instance of a software implementation of a machine (i.e. a computer) for emulating a physical machine, as described in greater detail later in association with FIG. 3.

The system 200 may include simulation clients 226 configured to host a portion of a simulation environment. A simulation client 226 may include a VR, AR, or mixed reality device, such as a VR headset, gaming device, desktop computer, augmented reality headset, smart television or other computing device capable of generating and presenting a simulation environment. The simulation clients 226 may be in network communication with the computing service environment 202. A physical user, who may be represented by a virtual user (e.g., an avatar), may use a simulation client 226 to interact with a simulation environment and other virtual users, simulated characters, or objects within the simulation environment. A simulation environment may include a VR (Virtual Reality), AR (Augmented Reality), or mixed reality environment. A VR environment may comprise a computer generated environment that includes images, sounds, and other sensations that simulates a user's physical presence in a virtual environment. An AR environment may comprise a direct or indirect view of a physical, real-world environment whose elements are augmented by computer-generated sensory input, such as sound, video, and graphics. A mixed reality environment may comprise merging of real world and virtual worlds to produce new environments and visualizations where physical and digital objects co-exist and interact in real-time.

A simulation client 226 may be configured to detect an interactive event that occurs in a simulation environment and send an indication of the interactive event, via an API request sent to an API gateway 212, to the virtual object service 210. In one example, an API request may identify an interactive event and the API request may include context information for the interactive event provided by a simulation client 226 that may be used to identify object data 218 for a virtual object. Illustratively, the context information may include interactive event information (e.g., entering a virtual space or interacting with an object), virtual user information (e.g., personally identifying information, demographic information, product purchase history, or browsing history), and/or simulation environment information (e.g., an environment type, virtual geographic location, gameplay information, or virtual time and weather information). In response to receiving an API request from a simulation client 226, the virtual object service 210 may initiate streaming of object data 218 for a virtual object to the simulation client 226, as explained below, and the simulation client 226 may use the object data 218 to incorporate the virtual object into a simulation environment executed on the simulation client 226. The object data 218 may include graphics, speech text, audio or even video for a virtual object. Speech text included in object data 218 may be used to convey a message to a physical user of a simulation client 226.

In one example, object data 218 may be formatted using JSON objects and the JSON objects may be streamed to a simulation client 226 using JSON streaming. A simulation client 226 may include a virtual object SDK (Software Development Kit) that provides a software framework for processing an object data stream received from the computing service environment 202.

The servers 204, 214, 220 may host managed services used as part of providing object data 218 for virtual objects to simulation clients 226. In the example illustrated in FIG. 2, the servers 204 may host a virtual object service 210. The virtual object service 210 may be configured to identify object data 218 for a virtual object in response to an indication of an interactive event detected by a simulation client 226. For example, in response to an API request from a simulation client 226, context information included in the API request may be provided to the virtual object service 210. The virtual object service 210 may be configured to use the context information to query a data storage service 216 for object data 218 associated with the context information. The data storage service 216 may use the context information to identify object data 218 for a virtual object that is associated with the context information. More specifically, the object data 218 may be associated with metadata that links the object data 218 to an interactive event. The metadata may be analyzed to identify the object data 218 associated with the interactive event.

In one example, user attributes for a virtual user, who is associated with an interactive event, may be obtained from a virtual user profile 230 and the user attributes may be used to identify object data 218 for a virtual object. A virtual user profile 230 may be associated with a user of a computing service provider who provides computing services, retail services, and other services to users. The user's virtual user profile 230 may be linked to a user account for the computing service provider. Illustratively, user attributes included in a virtual user profile 230 may include: personally identifying information, demographic information, a product purchase history, a browsing history, as well as other attributes. The user attributes may be used to identify metadata for object data 218 that is associated with the user attributes. Also, in one example, a user may indicate user preferences in the virtual user profile 230 that indicate categories of virtual objects that are allowed to be rendered in a simulation environment. More specifically, the user preferences may specify types of messages the user is willing to be presented with by virtual objects incorporated into a simulation environment.

In one example, the data storage service 216 may be configured to stream object data 218 for a virtual object to a simulation client 226 that requested the object data 218. The object data 218 may include speech text or audio, virtual object graphics, animation instructions, or video. In one example, prior to streaming object data 218 to a simulation client 226, speech text may be submitted to a text-to-speech service 208. The text-to-speech service 208 may be configured to convert the speech text to audio (e.g., an audio stream), which may be provided to a simulation client 226.

The text-to-speech service 208 may also be configured to generate animation instructions that are used to synchronize animation of a virtual object with speech text or an audio stream. In one example, animation instructions may include speech mark data. The speech mark data may include at least one of: a sentence element that indicates a sentence, a word element that indicates a word, a viseme that indicates a face and mouth movement that corresponds to a phoneme, and/or SSML (Speech Synthesis Markup Language). A simulation client 226 may use the speech mark data for facial animation of a virtual object.

In another example, serverless computing may be used to identify object data 218 for a virtual object in response to an indication of an interactive event detected by a simulation client 226 and stream the object data 218 to the simulation client 226. Serverless computing may be a computing execution model in which a computing service provider dynamically manages the allocation of computing resources used to execute compute service program code 232, and charges a customer based on the amount of computing resources consumed by the compute service program code 232.

Compute service program code 232 may be a segment of program code that may be like a function, and the compute service program code 232 may receive parameters, perform processing and provide return values. In one aspect, the compute service program code 232 may execute on a managed compute service code platform for back-end web services that runs a defined program code on a computing instance. That is, the compute service program code 232 may execute in the computing service environment 202 that runs the compute service program code 232 in response to requests, and automatically manages the compute resources used by the compute service program code 232. Once a compute service program code 232 has been executed and results have been returned to a requesting entity, the compute service program code 232 and results may be removed from the memory of the computing instance in which the compute service program code 232 was executing. Compute service program code 232 provides for building smaller, on-demand applications that may be responsive to events and new information. For example, back-end services may be automatically provisioned in response to receiving a request to execute compute service program code 232. In one aspect, compute service program code 232 may be triggered in response to an event, may execute or perform a function in response to the event, and return a response or value. A data source or target resource utilized by the compute service program code 232 may be located outside of the computing service environment 202. For example, a data source for object data 218 for a virtual object may be located in a private data center or at another remote location accessible via the Internet.

In one example, compute service program code 232 may be configured to perform actions that include identifying object data 218 for a virtual object in response to an API request, obtaining an audio stream and animation instructions from the text-to-speech service 208, and requesting and streaming object data 218 to a simulation client 226. For example, an API request from a simulation client 226 may trigger compute service program code 232 that obtains object data 218 for a virtual object specified in the API request, obtains an audio stream and animation instructions for speech text included in the object data 218, and initiates streaming of the audio stream, animation instructions, and virtual object graphics to the simulation client 226.

As illustrated, the server 220 may host a customer API 224 used by customers of the computing service provider to manage object data 218 for virtual objects stored in the computing service environment 202 using the data storage service 216. In some examples, customers of the computing service provider may be provided with a virtual object SDK (Software Development Kit) 222. Customer may create, upload, and/or modify object data 218 for the customer's virtual objects using the virtual object SDK 222.

Object data 218 for virtual objects may be stored on data stores managed by the data storage service 216. In one example, the data stores may include virtual storage. Virtual storage is the pooling of physical storage from multiple network storage devices to represent a single storage device that is managed by the data storage service 216. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

A customer may use a client 228 to access the customer API 224. A client 228 may include a client device capable of sending and receiving data over a network. A client device may comprise, for example a processor-based system such as a computing device. A client device may be a device such as, but not limited to, a desktop computer, laptop or notebook computer, tablet computer, mainframe computer system, handheld computer, workstation, network computer, or other devices with like capability.

The various processes and/or other functionality contained within the system 200 may be executed on one or more processors that are in communication with one or more memory modules. The system 200 may include a number of computing devices that are arranged, for example, in one or more server banks or computer banks or other arrangements. The computing devices may support a computing environment using hypervisors, virtual machine monitors (VMMs) and other virtualization software.

API calls, procedure calls, or other network commands that may be made in relation to the services included in the computing service environment 202 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

A network may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain services may be discussed in connection with this technology. In one example configuration, a service may comprise one or more processes executing on a server or other computer hardware. Such services may be centrally hosted functionality or a service application that may receive requests and provide output to other services or consumer devices. For example, services may be considered on-demand computing that are hosted in a server, virtualized service environment, grid or cluster computing system. An API may be provided for each service to enable a second service to send requests to and receive output from a first service. Such APIs may also allow third parties to interface with the services and make requests and receive output from the services. While FIG. 2 illustrates an example of a system that may implement the techniques above, many other similar or different environments are possible. The example environments discussed and illustrated above are merely representative and not limiting.

Figure 3:
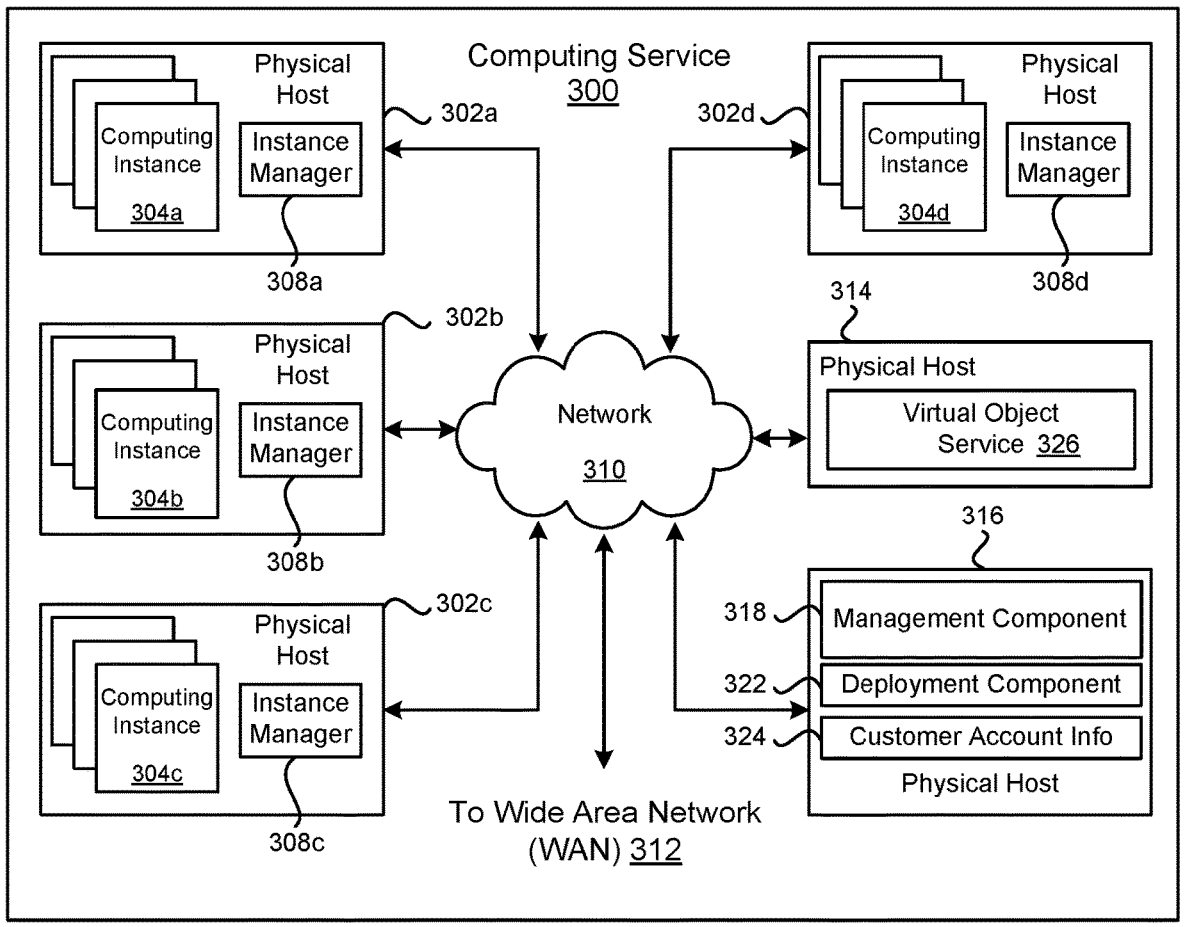
FIG. 3 is a block diagram that illustrates an example computing service environment that includes a virtual object service.

FIG. 3 is a block diagram illustrating an example computing service 300 that may be used to execute and manage a number of computing instances 304a-d. In particular, the computing service 300 depicted illustrates one environment in which the technology described herein may be used. The computing service 300 may be one type of environment that includes various virtualized service resources that may be used, for instance, to host computing instances 304a-d.

The computing service 300 may be capable of delivery of computing, storage and networking capacity as a software service to a community of end recipients. In one example, the computing service 300 may be established for an organization by or on behalf of the organization. That is, the computing service 300 may offer a "private cloud environment." In another example, the computing service 300 may support a multi-tenant environment, wherein a plurality of customers may operate independently (i.e., a public cloud environment). Generally speaking, the computing service 300 may provide the following models: Infrastructure as a Service ("IaaS"), Platform as a Service ("PaaS"), and/or Software as a Service ("SaaS"). Other models may be provided. For the IaaS model, the computing service 300 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 300. End customers may access the computing service 300 using networked client devices, such as desktop computers, laptops, tablets, smartphones, etc. running web browsers or other lightweight client applications, for example. Those familiar with the art will recognize that the computing service 300 may be described as a "cloud" environment.

The particularly illustrated computing service 300 may include a plurality of server computers 302a-d. While four server computers are shown, any number may be used, and large data centers may include thousands of server computers. The computing service 300 may provide computing resources for executing computing instances 304a-d. Computing instances 304a-d may, for example, be virtual machines. A virtual machine may be an instance of a software implementation of a machine (i.e. a computer) that executes applications like a physical machine. In the example of a virtual machine, each of the server computers 302a-d may be configured to execute an instance manager 308a-d capable of executing the instances. The instance manager 308a-d may be a hypervisor, virtual machine monitor (VMM), or another type of program configured to enable the execution of multiple computing instances 304a-d on a single server. Additionally, each of the computing instances 304a-d may be configured to execute one or more applications.

One or more server computers 314 and 316 may be reserved to execute software components for managing the operation of the computing service 300 and the computing instances 304a-d. For example, a server computer 314 may execute a virtual object service 326, which may be configured to perform the functions described earlier. A server computer 316 may execute a management component 318. A customer may access the management component 318 to configure various aspects of the operation of the computing instances 304a-d purchased by a customer. For example, the customer may setup computing instances 304a-d and make changes to the configuration of the computing instances 304a-d.

A deployment component 322 may be used to assist customers in the deployment of computing instances 304a-d. The deployment component 322 may have access to account information associated with the computing instances 304a-d, such as the name of an owner of the account, credit card information, country of the owner, etc. The deployment component 322 may receive a configuration from a customer that includes data describing how computing instances 304a-d may be configured. For example, the configuration may include an operating system, provide one or more applications to be installed in computing instances 304a-d, provide scripts and/or other types of code to be executed for configuring computing instances 304a-d, provide cache logic specifying how an application cache should be prepared, and other types of information. The deployment component 322 may utilize the customer-provided configuration and cache logic to configure, prime, and launch computing instances 304a-d. The configuration, cache logic, and other information may be specified by a customer accessing the management component 318 or by providing this information directly to the deployment component 322.

Customer account information 324 may include any desired information associated with a customer of the multi-tenant environment. For example, the customer account information may include a unique identifier for a customer, a customer address, billing information, licensing information, customization parameters for launching instances, scheduling information, etc. As described above, the customer account information 324 may also include security information used in encryption of asynchronous responses to API requests. By "asynchronous" it is meant that the API response may be made at any time after the initial request and with a different network connection.

A network 310 may be utilized to interconnect the computing service 300 and the server computers 302a-d, 316. The network 310 may be a local area network (LAN) and may be connected to a Wide Area Network (WAN) 312 or the Internet, so that end customers may access the computing service 300. The network topology illustrated in FIG. 3 has been simplified, many more networks and networking devices may be utilized to interconnect the various computing systems disclosed herein.

Figure 4:
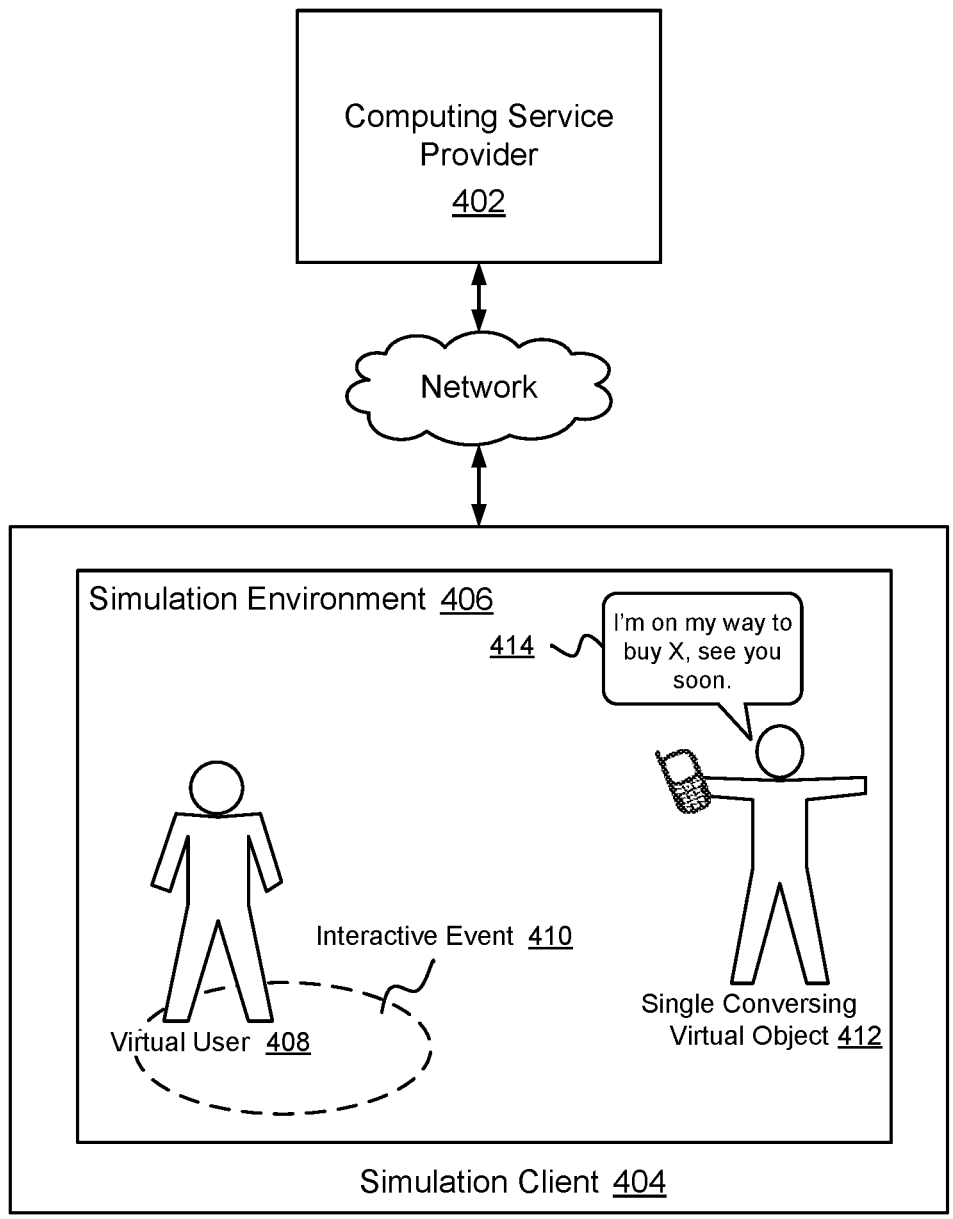
FIG. 4 is a diagram illustrating an example of a virtual object configured to simulate a one-sided conversation.

In FIG. 4, a diagram illustrates an example of a virtual object 412 that is configured to simulate a one-sided conversation. That is, the virtual object 412 may be configured to simulate a one-sided conversation 414, such that the conversation 414 may be "overheard" by a virtual user 408 that triggered the interactive event 410. The conversation 414 may be indirectly intended for a physical user represented in the simulation environment 406 by a virtual user 408. As an illustration, the virtual object 412 (i.e., virtual character) may be animated to speak into a cell phone, such that the virtual object 412 appears to be talking to someone on the other end of the phone call. The conversation 414 simulated by the virtual object 412 may comprise audio output or textual output, and the message of the conversation may be indirectly intended for a physical user of a simulation client 404. Thus, the message may be relevant to the physical user, but is not directed to the physical user. In the case that the conversation 414 has audio output, the volume and direction of the audio output may coincide with attributes of a background conversation that is capable of being overheard by a virtual user 408 in a simulation environment 406.

The virtual object 412 may be obtained from a computing service provider 402 and incorporated into a simulation environment 406 in response to an interactive event 410. As a non-limiting example, a virtual user 408 may walk down a virtual street in the simulation environment 406 and pass a waypoint. Passing the waypoint may be an interactive event 410 that triggers the simulation client 404 to obtain object data for the virtual object 412 from the computing service provider 402. The object data may include an audio stream, graphics, and animation instructions used by the simulation client 404 to animate the virtual object as a background object in the simulation environment 406. For example, the virtual object 412 may be animated to talk on a cell phone so that as a virtual user 408 passes by the virtual object 412, the virtual user 408 may "overhear" a one-sided conversation being spoken by the virtual object 412 that conveys a message to the virtual user 408.

Figure 5:
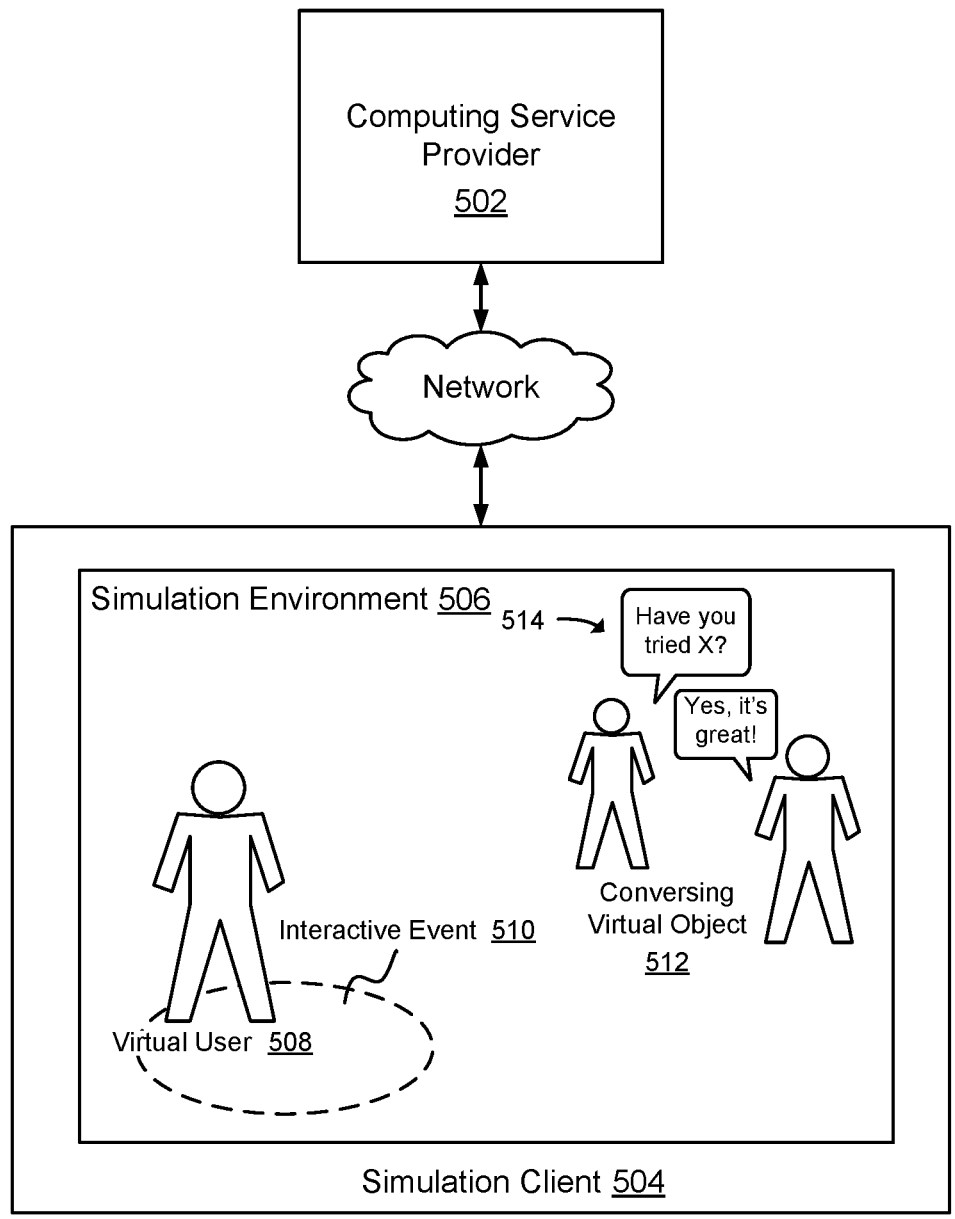
FIG. 5 is a diagram that illustrates an example of a virtual object configured to simulate a conversation between two or more entities.

FIG. 5 is a diagram illustrating an example of a virtual object 512 configured to simulate a conversation 514 between a plurality of entities. For example, the virtual object 512 may simulate a conversation 514 that takes place between a number of virtual persons or characters, such that the conversation 514 may be "overheard" by a virtual user 508 who triggered an interactive event 510. As described above, the conversation 514 may be indirectly intended for a physical user represented in a simulation environment 506 by a virtual user 508. For example, the virtual object 512 may represent two or more individuals who are engaged in a conversation. However, the message of the conversation may be targeted to the physical user of the simulation client 504 and a customer of the computing service provider 502 may desire the physical user to feel like the conversation is being overheard and the conversation is part of the background of the simulation environment 506.

As a non-limiting example, a virtual user 508 may enter a virtual shopping mall in a simulation environment 506. Entering the shopping mall may be an interactive event 510 that triggers a simulation client 504 to retrieve streaming object data for the virtual object 512 from a computing service provider 502. The object data may include an audio stream, graphics, and animation instructions used by the simulation client 504 to animate two individuals talking between themselves about a product that is available for purchase from the virtual shopping mall. The two individuals may be in virtual proximity to the virtual user 508 that allows the virtual user 508 to "overhear" the conversation. More specifically, audio output of the conversation may be provided to a physical user of the simulation client 504, allowing the physical user to hear the message conveyed in the conversation.

Figure 6:
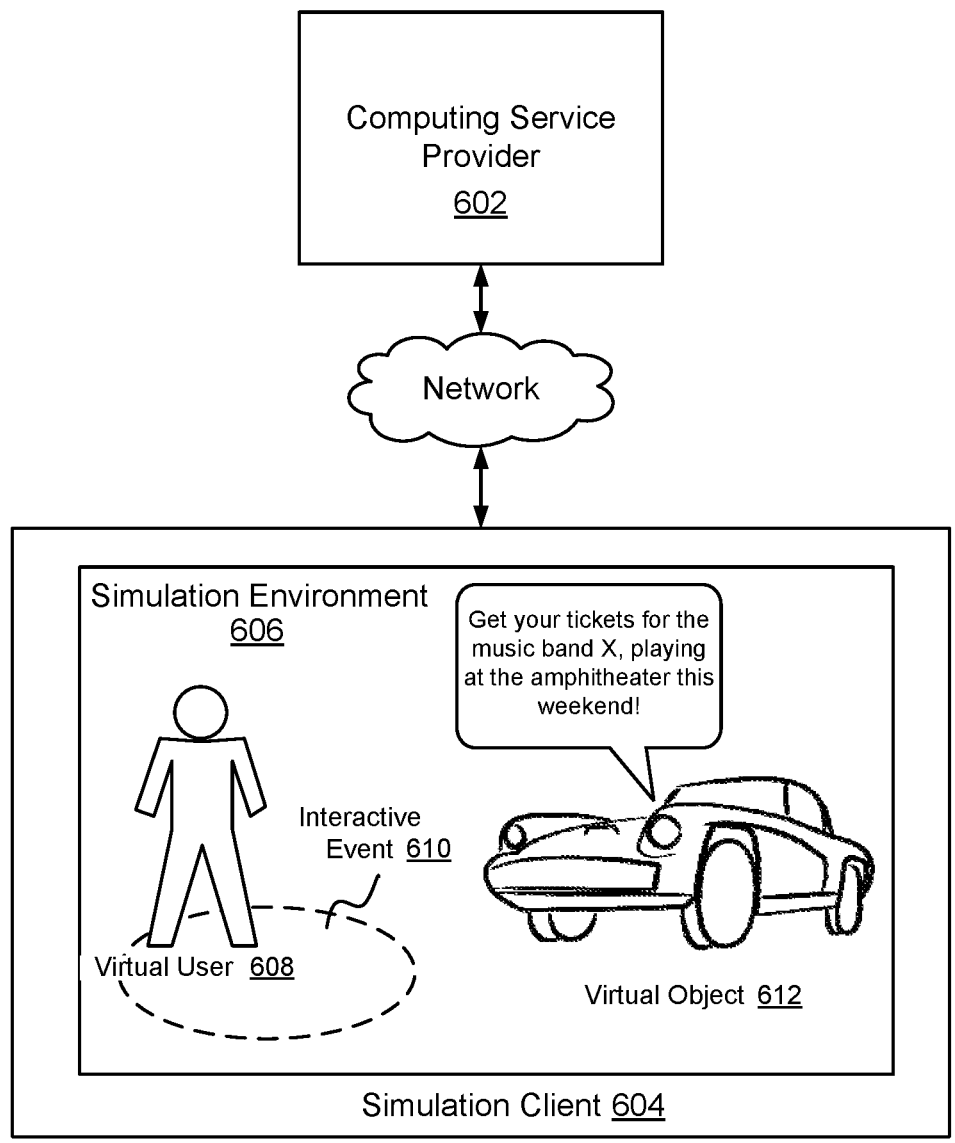
FIG. 6 is a diagram illustrating an example of a virtual object configured to provide a narration that is perceived to originate from a feature located in a simulation environment.

FIG. 6 is a diagram illustrating an example of a virtual object 612 configured to provide a narration perceived to originate from a feature in a simulation environment 606. For example, the virtual object 612 may comprise a feature capable of communicating a message (e.g., a vehicle (stationary or moving), large screen monitor, a virtual radio speaker, billboard, magazine, etc.). The narration emanating from the virtual object 612 may be "overheard" by a virtual user 608 that triggered an interactive event 610, and a message conveyed via the narration may be targeted to the physical user of the simulation client 604.

As a non-limiting example, a virtual user 608 may approach a virtual vehicle in a simulation environment 606. Approaching the vehicle may be an interactive event 610 that causes a simulation client 604 to obtain object data for the virtual object 612 from a computing service provider 602. The object data may include an audio stream, and may include graphics and animation instructions used by the simulation client 404 to animate a narration emanating from the virtual object 612. For example, the virtual vehicle may be animated to appear to be playing a narration on a car radio that can be "overheard" by the virtual user 408, and the narration may convey a message that is directed to the physical user of the simulation client 604.

Figure 7:
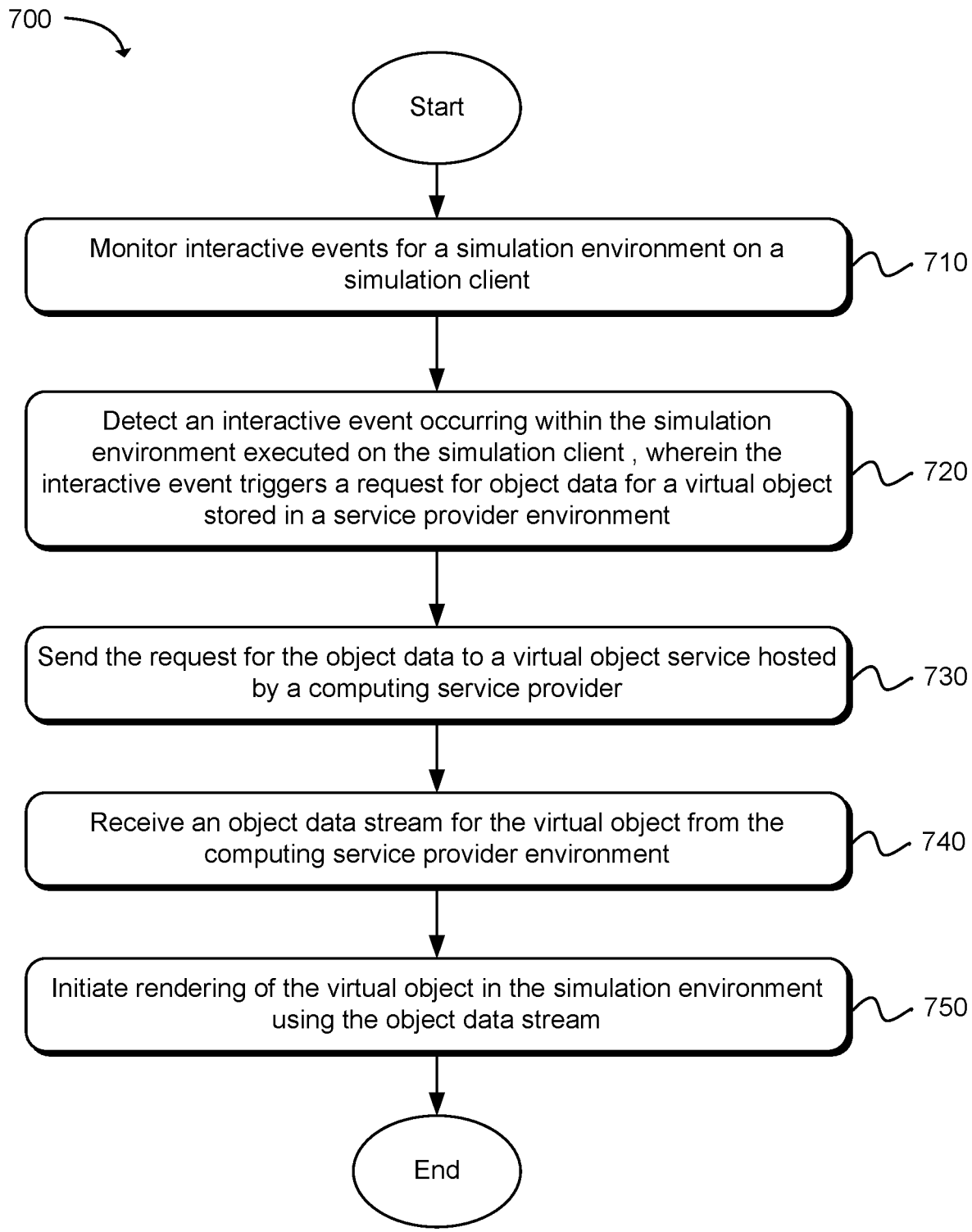
FIG. 7 is a flow diagram that illustrates an example method for incorporating a virtual object into a simulation environment in response to detecting an interactive event.

FIG. 7 is a flow diagram illustrating an example method 700 for incorporating a virtual object into a simulation environment in response to detecting an interactive event. As in block 710, interactive events for a simulation environment may be monitored on a simulation client. For example, the simulation client may be configured to detect the occurrence of an interactive event associated with a virtual user, such as entering a virtual space, passing a waypoint, or interacting with a virtual object in the simulation environment.

As in block 720, an interactive event occurring within the simulation environment executed on the simulation client may be detected. The interactive event may trigger a request for object data for a virtual object stored in a computing service provider environment. For example, in response to detecting the interactive event, the simulation client may collect context information associated with the interactive event (e.g., interactive event information, virtual user information, and/or simulation environment information) and generate an API request that includes the context information.

As in block 730, the request for the object data may be sent to a virtual object service hosted by a computing service provider. For example, the simulation client may send an API request to a virtual object service hosted in the computing service environment and context information included in the API request may be provided to the virtual object service. The virtual object service may use the context information to identify object data for a virtual object associated with the interactive event. The object data for the virtual object may then be streamed to the simulation client.

As in block 740, an object data stream for the virtual object may be received from the computing service provider environment. The object data stream may include graphics, animation instructions, and an audio stream for the virtual object. In one example, graphics for a virtual object, such as a static feature in a simulation environment, may be stored on the simulation client; therefore an object data stream may include an audio stream, but may not include graphics and animation instructions for the virtual object.

As the object data stream for the virtual object is received at the simulation client, the simulation client, as in block 750, may initiate rendering of the virtual object in the simulation environment using the object data stream. The simulation client may synchronize animation of the virtual object with the audio stream included in the object data stream. For example, the object data stream may include speech mark data used for facial animation of the virtual object to speak words included in the audio stream in synchronization of audio output of the audio stream.

Figure 8:
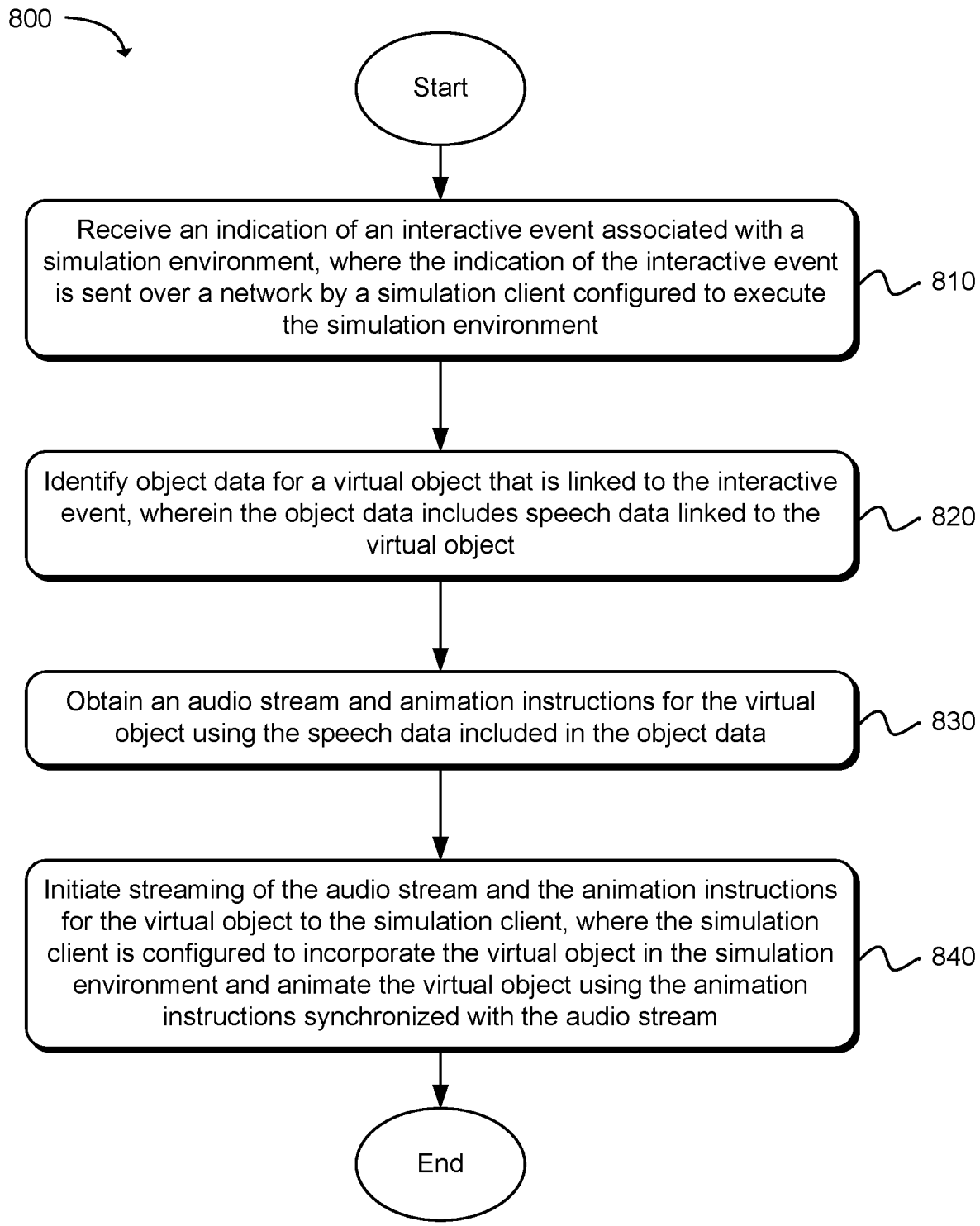
FIG. 8 is a flow diagram illustrating an example method for streaming object data for a virtual object to a simulation client in response to receiving an indication of an interactive event in a simulation environment executed by the simulation client.

FIG. 8 is a flow diagram that illustrates an example method 800 for streaming object data for a virtual object to a simulation client in response to receiving an indication of an interactive event in a simulation environment executed by the simulation client. As in block 810, an indication of an interactive event associated with a simulation environment may be received, and the indication of the interactive event may be sent over a network by a simulation client configured to execute the simulation environment. The interactive event may be entering a virtual area, passing a waypoint, or interacting with a virtual object in the simulation environment, etc.

In response to receiving the indication of the interactive event, as in block 820, object data for a virtual object that is linked to the interactive event may be identified, and the object data may include speech data (e.g., speech text or speech audio) linked to the virtual object. Also, in one example, the object data may include virtual object graphics. In another example, a virtual object may be provided by a customer of a computing service provider and the virtual object may be dynamically incorporated into a simulation environment to deliver a message to a physical user of a simulation client. Object data for a virtual object provided by a customer may include speech data configured to advertise a product or a service to a physical user of a simulation client via the virtual object. Identifying the virtual object in response to receiving the indication of the interactive event may include identifying user attributes for a virtual user associated with the interactive event. The user attributes may be used in part to identify object data for the virtual object.

As in block 830, an audio stream and animation instructions for the virtual object may be obtained using the speech data included in the object data. For example, speech text included in the object data may be submitted to a text-to-speech service configured to convert the speech text to an audio stream and generate the animation instructions using the speech text. The animation instructions may be used by the simulation client to synchronize animation of the virtual object with the audio stream. As described earlier, in one example, the animation instructions may include speech mark data that may be used by the simulation client to animate the virtual object to speak words included in the audio stream.

Having obtained the audio stream and the animation instructions, as in block 840, streaming may be initiated for audio stream and the animation instructions for the virtual object to the simulation client. The simulation client may receive the audio stream and animation instructions and incorporate the virtual object in the simulation environment using the audio stream and animation instructions, such that animation of the virtual object may be synchronized with the audio stream using the animation instructions. In one example, graphics for the virtual object may be streamed along with the audio stream and animation instructions to the simulation client and the simulation client may use the graphics and the animation instructions to animate the virtual object in synchronization with the audio stream. In another example, graphics for the virtual object may be on the simulation client (e.g., stored on the simulation client), and the graphics and the animation instructions may be used to animate the virtual object in synchronization with the audio stream.

Figure 9:
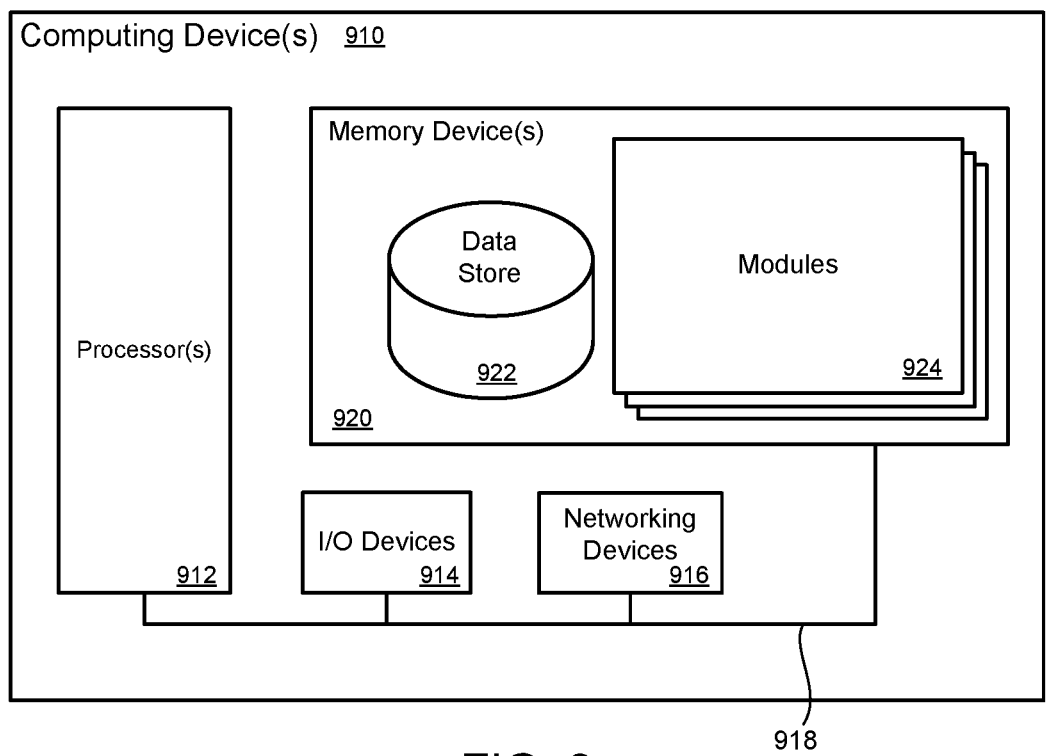
FIG. 9 is block diagram illustrating an example of a computing device that may be used to execute a method for incorporating a virtual object into a simulation environment in response to detecting an interactive event.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device 910 may include a local communication interface 918 for the components in the computing device. For example, the local communication interface 918 may be a local data bus and/or any related address or control busses as may be desired.

The memory device 920 may contain modules 924 that are executable by the processor(s) 912 and data for the modules 924. For example, the memory device 920 may include a virtual object module, a text-to-speech module, and other modules. The modules 924 may execute the services and functions described earlier. A data store 922 may also be located in the memory device 920 for storing data related to the modules 924 and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor(s) 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory device 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system comprising:
   at least one processor;
   a memory device including instructions that, when executed by the at least one processor, cause the system to:
   receive an indication of an interactive event occurring in a simulation environment, wherein the indication of the interactive event is received via an API (Application Programming Interface) request from a simulation client configured to execute the simulation environment;
   identify object data for a virtual object stored in a virtual object data store provided by a computing service provider, wherein the object data includes metadata that associates the virtual object with the interactive event and the object data includes graphics and speech text for a virtual object included in the simulation environment as a background object to convey a message contained in the speech text as a background message in the simulation environment that indirectly communicates the message to a user of the simulation environment;
   obtain an audio stream and animation instructions from a text-to-speech service configured to convert the speech text for the virtual object to the audio stream and generate the animation instructions using the speech text; and
   initiate streaming of the graphics, the audio stream, and the animation instructions to the simulation client from the virtual object data store via a network, to enable the simulation client to include the virtual object in the simulation environment and virtual object animation to be synchronized with the audio stream.

2. The system in claim 1, wherein the animation instructions include speech mark data generated by the text-to-speech service and the speech mark data is used by a simulation client to animate the virtual object to simulate a one-sided conversation, a conversation between a plurality of virtual objects, or a narration that emanates from the virtual object provided as a feature in the simulation environment.

3. The system in claim 1, wherein the memory device includes instructions that, when executed by the processor, cause the system to further construct conversation text for the virtual object using the speech text included in the object data as selected based in part on context information for the interactive event, wherein the speech text includes conversation nodes that are linked to the context information for the interactive event.

4. The system in claim 1, wherein the memory device includes instructions that, when executed by the processor, cause the system to further:
receive the object data for the virtual object via a customer API, wherein the virtual objects are created by customers of the computing service provider for inclusion as background objects in simulation environments;
analyze the object data for attributes that correlate to context information used in part to select the virtual object for inclusion in the simulation environment;
generate the metadata for the attributes that correlate to the interactive events; and
enable storing of the object data and the metadata in the virtual object data store.

5. The system in claim 4, wherein the memory device includes instructions that, when executed by the processor, cause the system to further:
receive the metadata for the object data via the customer API, wherein the metadata includes context information used in part to select the virtual object for inclusion in the simulation environments.

6. A computer implemented method, comprising:
receiving an indication of an interactive event associated with a simulation environment, wherein the indication of the interactive event is sent over a network by a simulation client configured to execute the simulation environment;
identifying object data for a virtual object linked to the interactive event, wherein the virtual object is a background object in the simulation environment and the object data includes speech data linked to the virtual object used to convey a message contained in the speech data as a background message in the simulation environment that indirectly communicates the message to a user of the simulation environment;
obtaining an audio stream and animation instructions for the virtual object from a text-to-speech service configured to convert the speech data to the audio stream and generate the animation instructions using the speech data; and
initiating streaming of the audio stream and the animation instructions for the virtual object to the simulation client, wherein the simulation client is configured to incorporate the virtual object in the simulation environment and animate the virtual object using the animation instructions synchronized with the audio stream to convey the message.

7. The method in claim 6, wherein the speech data included in the object data is configured for a one-sided virtual object output.

8. The method in claim 6, wherein the speech data included in the object data is configured for a conversation between a plurality of virtual objects.

9. The method in claim 6, wherein the speech data included in the object data is configured to provide a narration that emanates from the virtual object provided as a feature in the simulation environment.

10. The method in claim 6, wherein the speech data included in the object data is configured to advertise a product or a service to a physical user of the simulation client via the virtual object.

11. The method as in claim 6, wherein the interactive event associated with the simulation environment includes detecting that a virtual user is in a portion of virtual space in the simulation environment that causes the simulation client to send the indication.

12. The method as in claim 6, wherein the interactive event occurring within the simulation environment includes detecting a virtual user action that causes the simulation client to send the indication.

13. The method as in claim 6, wherein identifying the virtual object further comprises identifying user attributes for a virtual user associated with the interactive event, wherein the user attributes are used in part to identify the object data for the virtual object.

14. The method in claim 13, wherein the user attributes include at least one of: personally identifying information, demographic information, a product purchase history, and a browsing history.

15. The method in claim 13, further comprising constructing conversation text for the virtual object using the speech data included in the object data and the user attributes for the virtual user associated with the interactive event, wherein the speech data includes conversation nodes that are associated with the user attributes and the conversation nodes associated with the user attributes are selected to construct the conversation text.

16. The method in claim 6, wherein the object data for the virtual object further includes virtual object graphics and animation instructions for the virtual object and the animation instructions include speech mark data used for facial animation of the virtual object.

17. The method in claim 6, further comprising:
analyzing the object data for the virtual object for attributes that correlate to interactive events when the object data is uploaded to an object data store;
generating metadata for the attributes that correlate to the interactive events; and
linking the metadata to the object data for the virtual object, wherein the metadata is used in part to select the virtual object for inclusion in the simulation environment.

18. A non-transitory machine readable storage medium for a simulation client, the non-transitory machine readable storage medium having instructions embodied thereon, the instructions when executed by a processor:
monitor interactive events for a simulation environment on the simulation client;
detect an interactive event occurring within the simulation environment executed on the simulation client, wherein the interactive event triggers a request for a virtual object linked to the interactive event stored in a computing service provider environment;

send the request for the virtual object to a virtual object service hosted by a computing service provider, wherein the virtual object service obtains an audio stream and animation instructions for the virtual object from a text-to-speech service that generates the audio stream and the animation instructions from speech data included in object data for the virtual object;

receive an object data stream for the virtual object from the virtual object service, wherein the object data stream includes the animation instructions and the audio stream for the virtual object that indirectly communicates a message to a user of the simulation environment as a background message in the simulation environment; and render the virtual object as a background object in the simulation environment using the object data stream, wherein the virtual object is animated using the animation instructions to convey a message contained in the audio stream, and animation of the virtual object is synchronized with the audio stream.

19. The non-transitory machine readable storage medium in claim 18, wherein the instructions that when executed by the processor further obtain user preferences for rendering the virtual object in the simulation environment, wherein the user preferences specify categories of virtual objects that are allowed to be rendered in the simulation environment.

20. The non-transitory machine readable storage medium in claim 18, wherein the simulation environment is rendered by the simulation client which is at least one of: a VR (Virtual Reality) environment, an AR (Augmented Reality) environment, or a mixed reality environment.

* * * * *